UNITED STATES PATENT OFFICE.

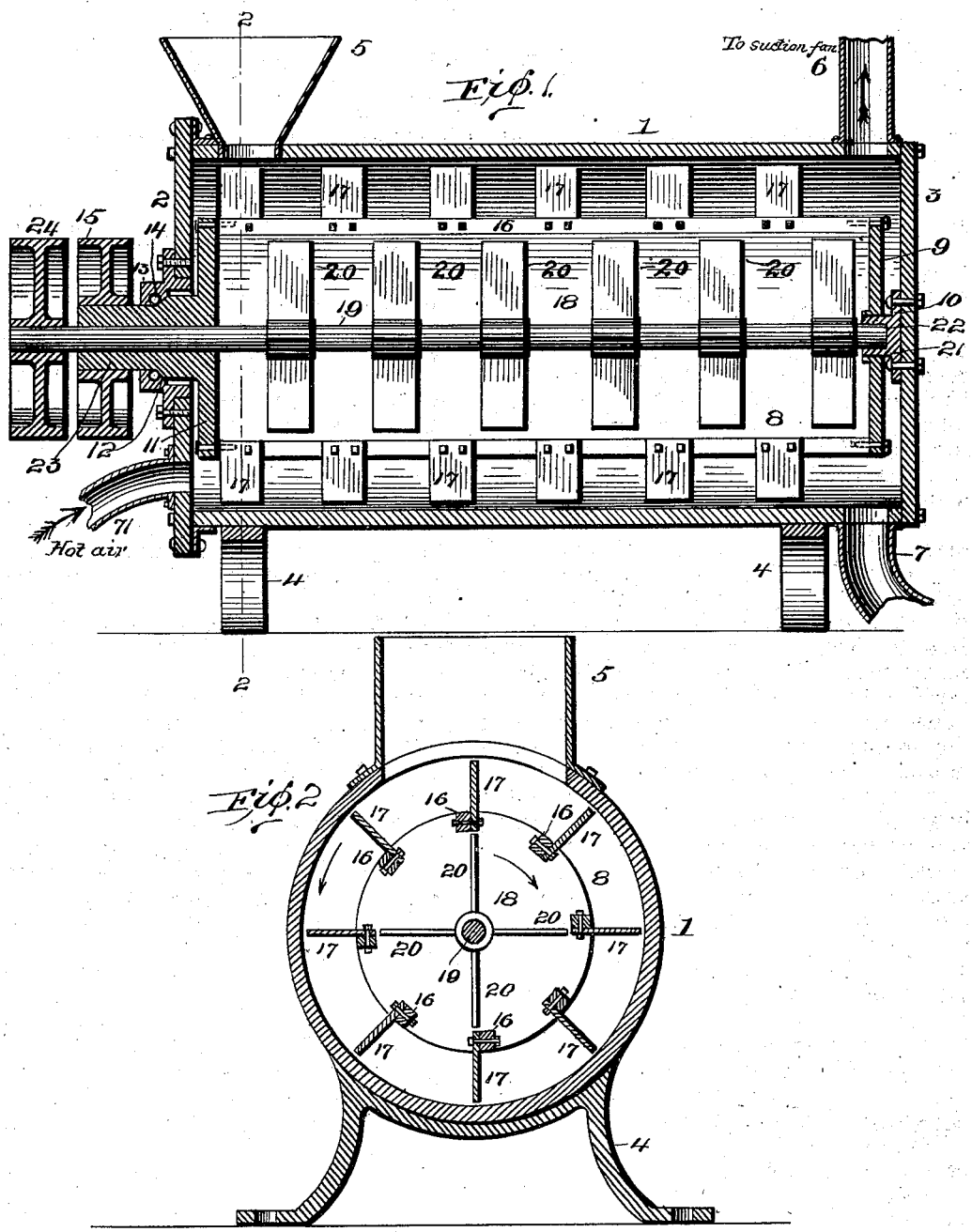

JOHN McFARLANE AND DAVID C. REINOHL, OF WASHINGTON, DISTRICT OF COLUMBIA.

MEANS FOR SEPARATING COTTON-SEED KERNELS FROM THEIR HULLS AND LINT.

SPECIFICATION forming part of Letters Patent No. 695,477, dated March 18, 1902.

Application filed November 11, 1901. Serial No. 81,846. (No model.)

*To all whom it may concern:*

Be it known that we, JOHN McFARLANE and DAVID C. REINOHL, citizens of the United States, residing at Washington, in the District of Columbia, have invented certain new and useful Improvements in Machines for Separating Cotton-Seed Kernels from Their Hulls and Lint; and we do hereby declare the following to be a full, clear, and exact description of the invention, such as will enable others skilled in the art to which it appertains to make and use the same.

Our invention relates to treating cotton-seed, has especial reference to the state of the art disclosed in our joint application for a patent for process of hulling cotton-seed, Serial No. 73,676, and in the sole application of John McFarlane, Serial No. 74,134, in which cotton-seed as they come from the gin incased in their lint and hulls are treated, denuded of their lint and hulls, and the kernels, the product resulting therefrom, are incased in their pericarp only and dried.

In the process of treating the seed, either in an alkali solution or in a solution of alkali and saccharine matter, the hulls open and the kernels separate therefrom and rise to the surface of the bath; but in treating large quantities of seed some of the kernels adhere to the hulls or become entangled in the lint and the hulls of the seed and must be removed therefrom to recover them and prevent loss by waste.

Our present invention consists in a machine for separating the kernels from the hulls and lint and will be fully disclosed in the following specification and claims.

In the accompanying drawings, which form part of this specification, Figure 1 represents a vertical longitudinal section; and Fig. 2, a transverse section on line 2 2, Fig. 1.

Reference being had to the drawings and the designating characters thereon, 1 indicates an elongated cylinder; 2, the front head thereof; 3, the rear head; 4 4, the supports. The cylinder may be made of hard wood and built of staves with wooden heads, or it may be made of boiler-iron, the front head being detachable for the insertion and removal of the beaters.

5 is a funnel through which the hulls, lint, and adhering kernels as they come from the vat and properly drained are supplied; 6, a pipe connected to a suction-fan (not shown) for removing the hulls and the lint after the kernels have been separated or detached therefrom; 7, a pipe through which the kernels separated from the lint and hulls are conducted to a suitable receptacle; 71, a pipe through which hot air is supplied to the cylinder to dry the lint and hulls, which pipe communicates with a force-pump. (Not shown.) The air is heated in any suitable or preferred manner, as by passing the pipe through the furnace of the steam-boiler which supplies the motor fluid to operate the machinery.

Within the cylinder is an outer revoluble beater 8, composed of a rear head 9, supported on a bearing 10, a front head 11, having a neck 12, which extends through the head 2 and the casting 13, forming a bearing and provided with antifriction-balls 14, and the neck is provided with a pulley 15, to which power is transmitted by a belt (not shown) from any suitable motor to revolve the beater. Between the heads 9 and 11 are secured bars 16, to which radial arms 17 are attached and extend nearly to the inner surface of the cylinder, and of these bars 16 there are eight shown, each supplied with arms 17; but their number may be varied according to the diameter of the cylinder 1.

18 is an inner revoluble beater within the beater 8, which is composed of a shaft 19, provided with radial arms 20, set or arranged intermediate the arms 17 of the beater 8, said shaft being supported at its rear end in a bearing 21 on the casting 22, which is made of any well-known antifriction metal and is secured to the rear head of the cylinder, and the front end of the shaft 19 is supported in a bearing 23 in the neck 12 of the front head 11 of the beater 8 and is provided with a pulley 24, by which power is transmitted to the beater 18 to revolve it in a direction opposite to the rotation of the beater 8 to effect a thorough beating of the hulls and lint and the dislodgment of any adhering or entangled kernels and at the same time causing the separation of a large per cent. of the hulls and lint and rendering the lint light and fluffy for subsequent use in the arts in which waste cotton is used.

The outer beater is revolved at from sixty to one hundred revolutions per minute, and the inner beater is revolved in the opposite direction at from two to three hundred revolutions per minute, which insures the contents of the cylinder being carried up from the lower to the upper side thereof, where they gravitate toward the bottom and in their descent fall between the arms of the outer beater and come in contact with the inner beater, which thoroughly loosens the kernels from the hulls.

While the beaters are separating the lint, the hulls, and the kernels they are pretty thoroughly dried by the hot air admitted through pipe 71, and they may be readily handled, and, if found necessary, they may be subsequently further dried.

The hulls detached from the lint by the beaters, being lighter than the kernels, pass off with the lint through the pipe 6, induced by the suction-pump, and the kernels gravitate to the bottom of the cylinder and pass off through the pipe 7.

Having thus fully described our invention, what we claim is—

1. A machine for the purpose described, consisting of an elongated cylinder provided with an inlet-passage on the upper side and at one end thereof, two separate discharge-passages for the material being treated communicating with the cylinder at the end opposite the inlet to the cylinder, one above and the other below the horizontal center thereof, and concentric and oppositely-revoluble beaters.

2. A machine for the purpose described, consisting of an elongated cylinder provided with an inlet-passage on the upper side and at one end thereof, a hot-air supply at the same end of the cylinder, two separate discharge-passages for the material operated upon at the opposite end of the cylinder, one above the other below the horizontal center thereof and communicating with the cylinder, and oppositely-revoluble beaters.

3. A machine for the purpose described, consisting of an elongated cylinder provided with an inlet for the material to be treated, and a supply-passage for hot air at or near one end thereof, a discharge for the light material operated upon at the upper side and communicating with said cylinder, a discharge for the heavy material operated upon at the lower side and communicating with the cylinder, both of said discharges being at the end of the cylinder opposite the inlet for the material to be treated, and concentric and oppositely-revoluble beaters.

4. A machine for the purpose described, consisting of an elongated cylinder provided with an inlet for the material to be treated at one end and at the upper side thereof, a hot-air supply at the same end and near the lower side of the cylinder, a discharge for the light material at the upper side thereof, a discharge for the heavy material at the lower side, both of said discharges being at the end opposite the inlet for the material to be treated, and concentric and oppositely-revoluble beaters.

5. A machine for the purpose described, consisting of an elongated cylinder provided with an inlet for the material to be treated, an inlet for hot air, a discharge for the light material, a discharge for the heavy material, an outer revoluble beater, and an inner revoluble beater concentric with the outer beater and having arms intermediate of the arms of the outer beater and revoluble in the opposite direction.

In testimony whereof we affix our signatures in presence of two witnesses.

JOHN McFARLANE.
DAVID C. REINOHL.

Witnesses:
D. WEIMER REINOHL,
W. PARKER REINOHL.